(12) United States Patent
Lee

(10) Patent No.: US 7,794,113 B2
(45) Date of Patent: Sep. 14, 2010

(54) ELECTRONIC DEVICE WITH LIGHTING APPARATUS

(75) Inventor: Ming-Chang Lee, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 268 days.

(21) Appl. No.: 12/056,240

(22) Filed: Mar. 26, 2008

(65) Prior Publication Data

US 2009/0166493 A1   Jul. 2, 2009

(30) Foreign Application Priority Data

Dec. 26, 2007   (CN) .................. 2007 1 0203414

(51) Int. Cl.
  *F21V 21/26* (2006.01)
(52) U.S. Cl. .................. 362/274; 362/269; 362/287; 362/288; 362/427
(58) Field of Classification Search .................. 362/85, 362/269, 274, 287, 288, 427; 345/168, 170; 361/679.26, 679.55
See application file for complete search history.

(56) References Cited

U.S. PATENT DOCUMENTS

| 6,380,921 | B2* | 4/2002 | Nakamura | 345/102 |
| 6,834,975 | B2* | 12/2004 | Chu-Chia et al. | 345/168 |
| 2008/0266865 | A1* | 10/2008 | Lev et al. | 362/287 |

* cited by examiner

*Primary Examiner*—Stephen F Husar
(74) *Attorney, Agent, or Firm*—Frank R. Niranjan

(57) ABSTRACT

An electronic device includes a base with a through hole defined therein, and a lighting apparatus. The lighting apparatus includes a bracket mounted to the base, a pivoting member pivotably attached to the bracket, a light fixed to the pivoting member, at least a resilient member arranged between the bracket and the pivoting member to restore the pivoting member, and a sliding member mounted to the bracket with a first end. A latch slot is defined in the pivoting member for receiving a second end of the sliding member, the pivoting member is driven by the at least a resilient member to pivot and the second end of the sliding member slide in the latch slot for achieving the pivoting member pivoting out or pivoting back through hole of the base.

16 Claims, 6 Drawing Sheets

ELECTRONIC DEVICE WITH LIGHTING APPARATUS

BACKGROUND

1. Field of the Invention

The present invention relates to electronic devices, and more particularly to an electronic device with a lighting apparatus.

2. Description of Related Art

Electronic devices, such as a portable computer, usually include data input units such as a keyboard. Typically, such data input units are not readily visible when used in the dark.

What is needed is to provide an electronic device with a lighting apparatus for overcoming the above disadvantage.

SUMMARY

In one embodiment, an electronic device includes a base with a through hole defined therein, and a lighting apparatus. The lighting apparatus includes a bracket mounted to the base, a pivoting member pivotably attached to the bracket, a light fixed to the pivoting member, at least a resilient member arranged between the bracket and the pivoting member to restore the pivoting member, and a sliding member mounted to the bracket with a first end. A latch slot is defined in the pivoting member for receiving a second end of the sliding member, the pivoting member is driven by the at least a resilient member to pivot and the second end of the sliding member to slide in the latch slot for achieving the pivoting member pivoting out of or pivoting back through the hole of the base.

Other advantages and novel features of the present invention will become more apparent from the following detailed description of an embodiment when taken in conjunction with the accompanying drawings, in which:

DETAILED DESCRIPTION

Figure 1:
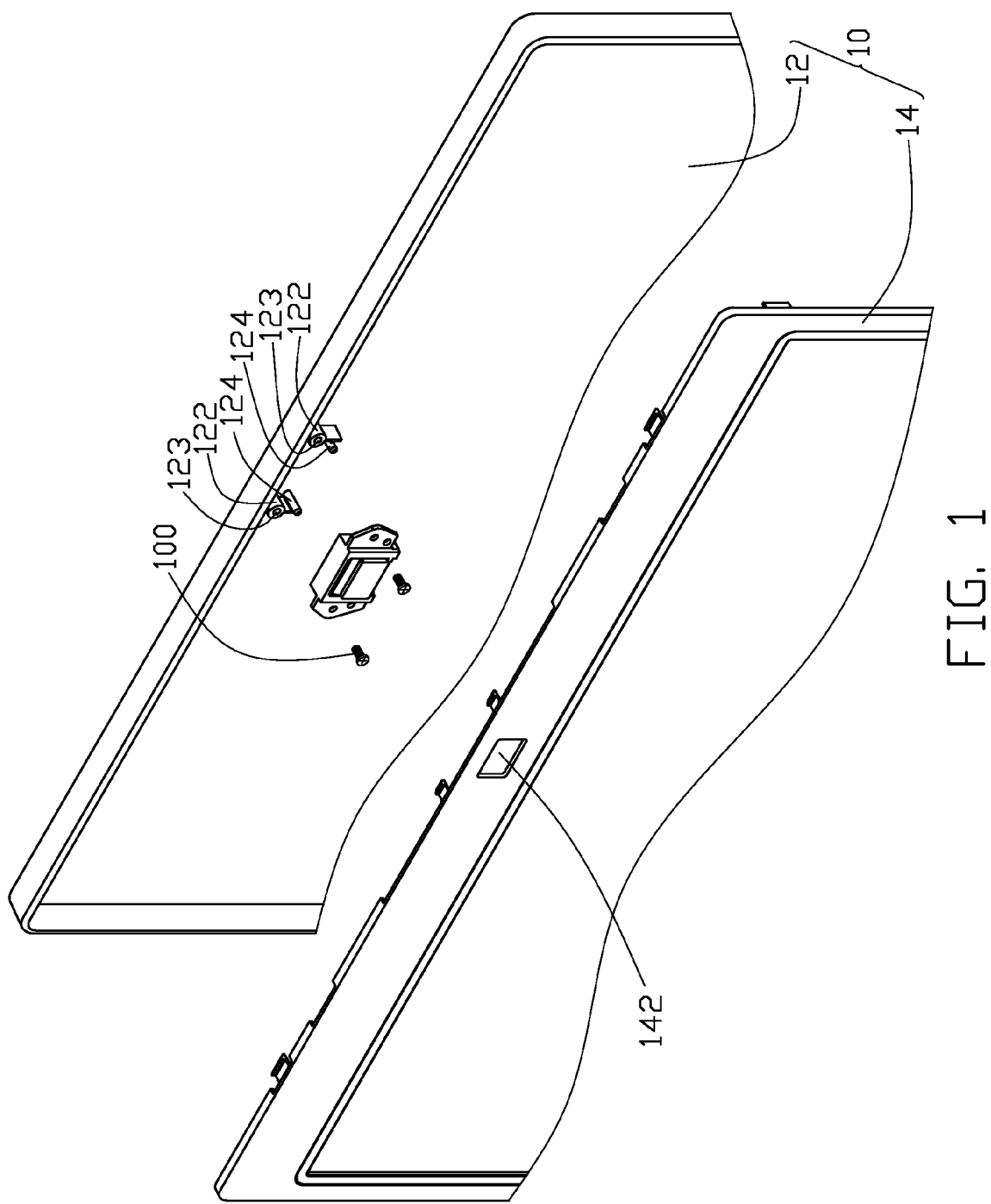
FIG. 1 is an exploded, isometric view of an electronic device in accordance with an embodiment of the present invention, the electronic device including a first panel, a second panel, and a lighting apparatus.
Figure 2:
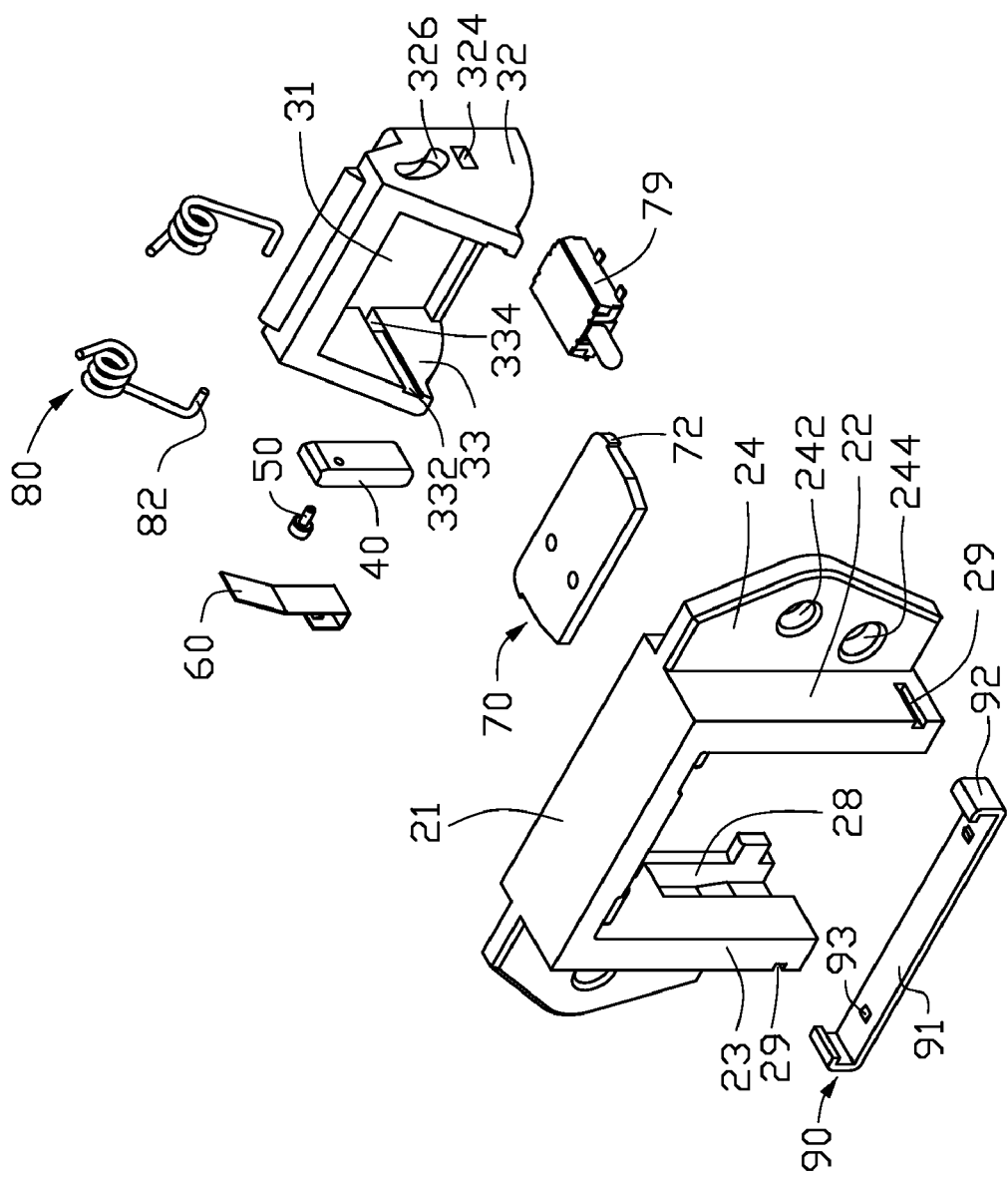
FIGS. 2 and 3 are exploded, isometric views of the lighting apparatus of FIG. 1, from different aspects.

Referring to FIGS. 1 and 2, an electronic device in accordance with an embodiment of the present invention includes a base 10, a lighting apparatus mounted to the base 10, and a plurality of fasteners 100. The base 10 is an LCD monitor of a portable computer or a desktop computer. In this embodiment, the fasteners 100 are screws.

The base 10 includes a first panel 12 and a second panel 14 mounted to the first panel 12, for sandwiching a liquid crystal display therebetween. Two mounting rods 122 extend toward the second panel 14 from an upper portion of the first panel 12. A mounting hole 123 is defined in each mounting rod 122. A locating rod 124 extends from the first panel 12 in the vicinity of each mounting rod 122. A rectangular through hole 142 is defined in an upper portion of the second panel 14.

Figure 3:
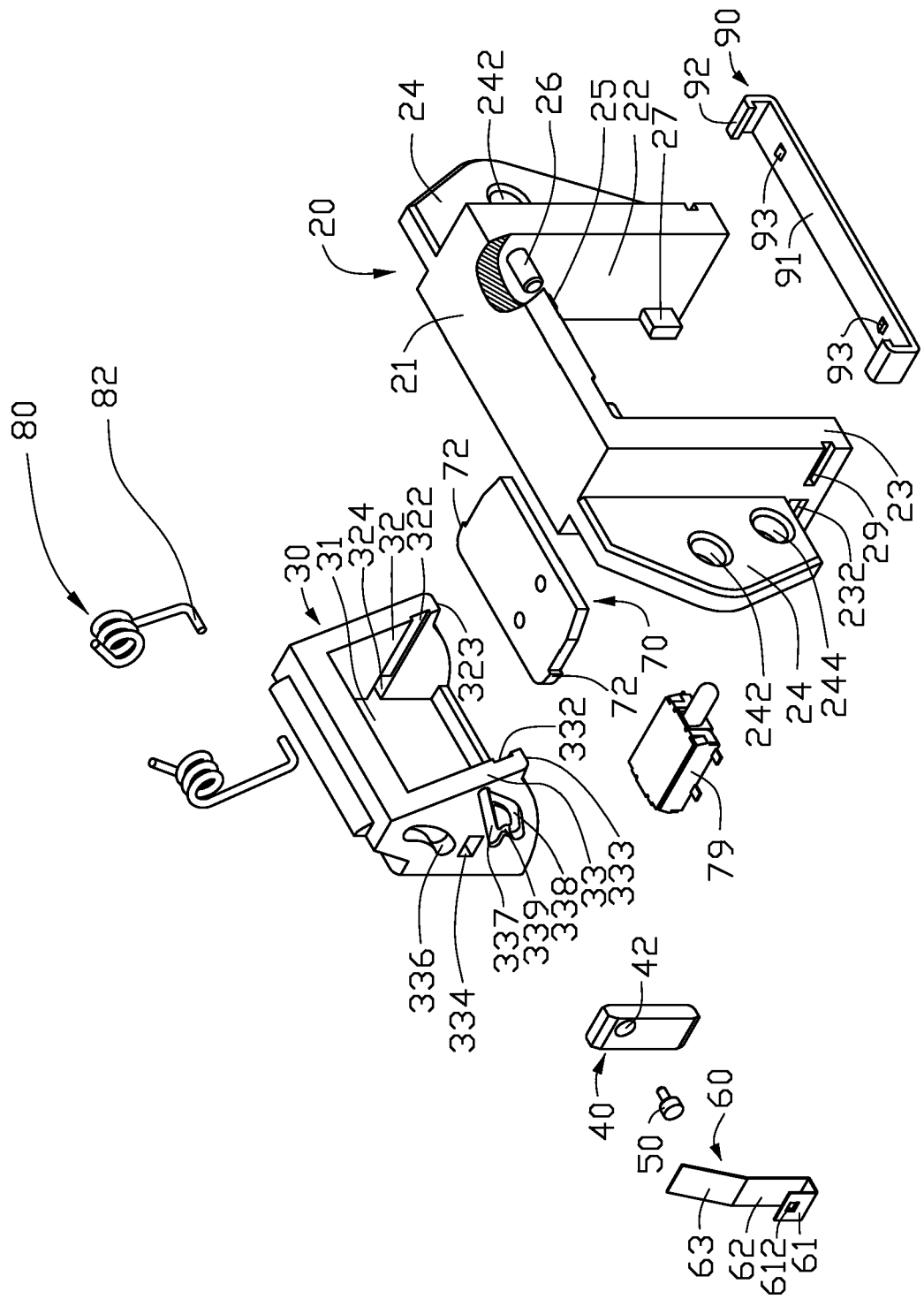

Referring also to FIGS. 2 and 3, the lighting apparatus includes a bracket 20, a pivoting member 30, a baffle member 40, a sliding member 50, a resilient piece 60, a mounting member 70, a light 79, two resilient members 80, and a locking member 90.

The bracket 20 is generally n-shaped, and includes a top wall 21, a first sidewall 22 and a second sidewall 23 extending down from opposite ends of the top wall 21 respectively. Two ears 24 extend from outer surfaces of the first and second sidewalls 22, 23 respectively. A through hole 242 and a locating hole 244 are defined in each ear 24. Two pivoting poles 25 extend from inner surfaces of the first and second sidewalls 22, 23 in the vicinity of the top wall 21, respectively. Two poles 26 extend respectively from the inner surfaces of the first and second sidewalls 22, 23 in the vicinity of the corresponding pivoting poles 25. Two blocks 27 extend from a lower portion of the inner surfaces of the first and second sidewalls 22, 23, respectively. A receiving slot 28 is defined in the inner surface of the second sidewall 23. A locking slot 29 is defined in a lower portion of the outer surface of each of the first and second sidewalls 22, 23, respectively. A depressed portion 232 is defined in the outer surface of the second sidewall 23 in the vicinity of the locking slot 29.

The pivoting member 30 includes a base board 31, a first board 32 and a second board 33 extending from opposites sides of the base board 31. The first and second boards 32, 33 are fan-shaped each with a narrow top and a wide bottom. Two opposite slots 322, 332 are defined respectively in inner surfaces of the first and second boards 32, 33. Two through holes 324, 334 are defined respectively in the first and second boards 32, 33 in the vicinity of the base board 31, communicating with the slots 322, 332 respectively. Two arc-shaped sliding slots 326, 336 are defined in upper portions of the first and second boards 32, 33, respectively. A latch slot is defined in a lower portion of an outer surface of the second board 33. The latch slot includes an unbent first sliding rail 337, an L-shaped second sliding rail 338, and a V-shaped third sliding rail 339. The first, second and third sliding rails 337, 338, 339 are communicated end to end. Two protrusions 323, 333 are formed at bottom portions of the first and second boards 32, 33, away from the base board 31.

The baffle member 40 is generally rectangular shaped. A through hole 42 is defined in an upper portion of the baffle member 40.

The sliding member 50 is a step-shaped column, and includes a large end and a small end.

The resilient piece 60 is made by bending a resilient metal piece, and includes a U-shaped main body. The main body includes a short sidewall 61 and a long sidewall 62 parallel to the short sidewall 61. A blocking portion 612 protrudes from the short sidewall 61 toward the long sidewall 62. A pressing portion 63 slantingly extends from a distal end of the long sidewall 62, away from the short sidewall 61.

The mounting member 70 is generally plate-shaped. Two latch portions 72 protrude from opposite ends of the mounting member 70. A plurality of mounting holes is defined in the mounting member 70.

The light 79 includes a main body and an illuminant arranged at one end of the main body. The illuminant can be an LED (light-emitting diode). The light 79 can be mounted to the mounting member 70 via a plurality of screws extending through the main body of the light 79 to be engaged in the mounting holes of the mounting member 70. Obviously, the light 79 can also be mounted to the mounting member 70 via adhesive such as glue.

The resilient members 80 are torsion springs. Each resilient member 80 includes a blocking end 82.

The locking member 90 is generally C-shaped, and includes a main body 91, and two L-shaped hooks 92 formed at opposite ends of the main body 91. Two protrusions 93 protrude from the main body 91 adjacent to the hooks 92 respectively.

Figure 4:
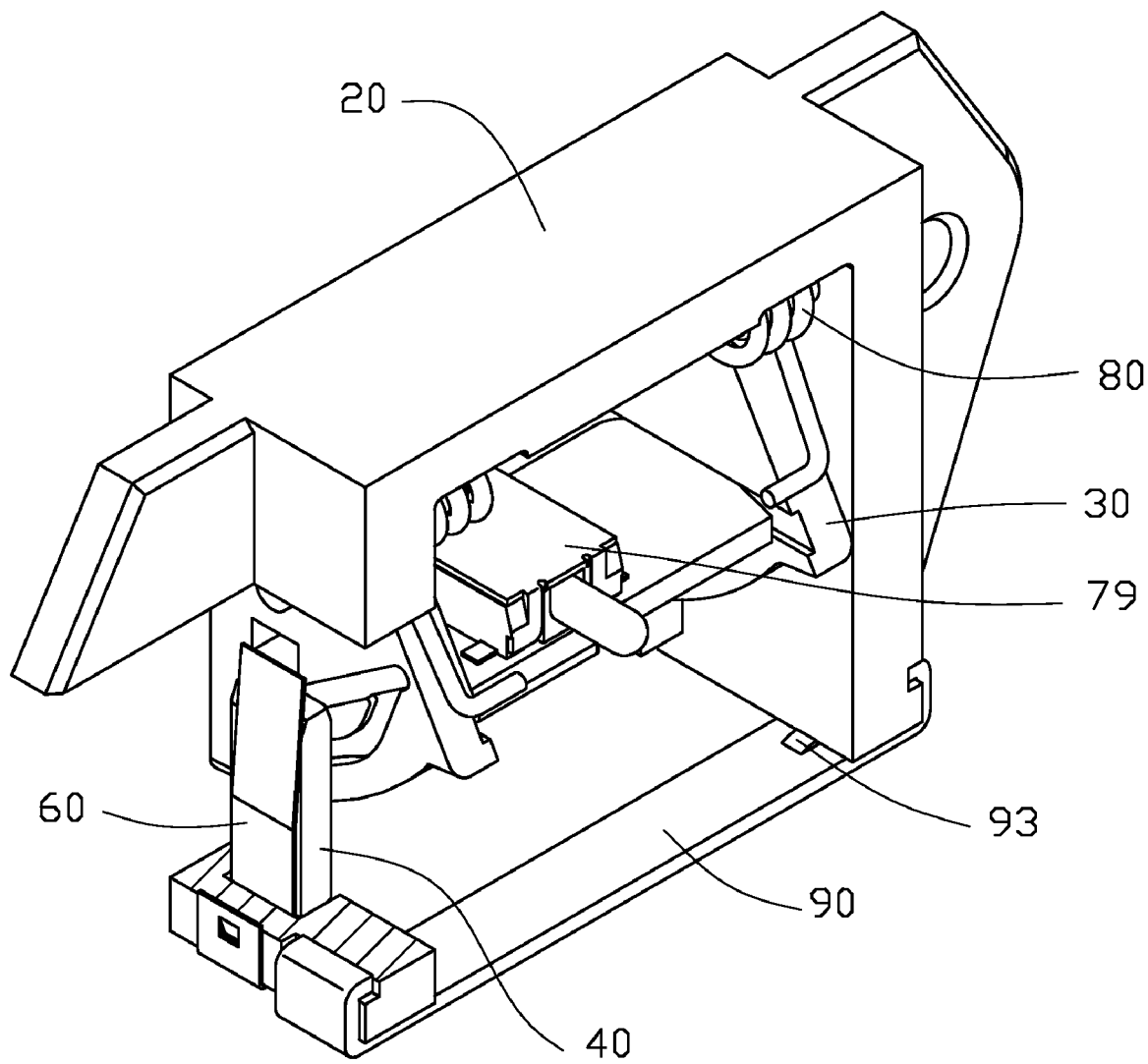
FIG. 4 is an assembled, partially cutaway view of FIG. 1, but viewed from another aspect.

Referring also to FIG. 4, in assembly, the light 79 is mounted to the mounting member 70. The mounting member 70 is locked to the pivoting member 30 via the ends thereof being received in the slots 322, 332 of the first and second boards 32, 33 respectively. The latch portions 72 of the mounting member 70 are engaged in the through holes 324, 334 of the pivoting member 30 respectively. The small end of the sliding member 50 extends through the through hole 42 of the baffle member 40 to engage in the latch slot of the pivoting member 30. The main body of the resilient piece 60 clamps a bottom of the second sidewall 23 of the bracket 20, therefore the short sidewall 61 of the resilient piece 60 tightly contacts the outer surface of the second sidewall 23, and the long sidewall 62 of the resilient piece 60 is received in the receiving slot 28 of the bracket 20.

The combined assembly of the pivoting member 30, the baffle member 40, the sliding member 50, the mounting member 70, and the light 79 is received in the bracket 20. The pivoting member 30 is pivotably attached to the bracket 20 via the pivoting poles 25 of the bracket 20 being slidably received in the arc-shaped sliding slots 326, 336 of the pivoting member 30 respectively. The resilient members 80 fit about the poles 26 of the bracket 20 respectively. The blocking ends 82 of the resilient members 80 are propped on the first and second boards 32, 33 of the pivoting member 30 respectively. The other ends of the resilient members 80 are propped on the top wall 21 of the bracket 20. The protrusions 323, 333 of the first and second boards 32, 33 of the pivoting member 30 are capable of engaging with the blocks 27 of the bracket 20 to avoid the pivoting member 30 moving away from the bracket 20 against the resilient members 80. The pressing portion 63 of the resilient member 60 resiliently presses the large end of the sliding member 50 to avoid the small end of the sliding member 50 disengaging from the latch slot of the pivoting member 30. The blocking portion 612 of the resilient piece 60 is engaged in the depressed portion 232 of the second sidewall 23.

The hooks 92 of the locking member 90 are engaged in the locking slots 29 of the first and second sidewalls 22, 23 respectively to cover an opening of the bracket 20 between the first and second sidewalls 22, 23. The protrusions 93 of the locking member 90 are engaged with the inner surfaces of the first and second sidewalls 22, 23 respectively.

The lighting apparatus is mounted to the first panel 12 via the locating rods 124 of the first panel 12 engaging in the locating holes 244 of the bracket 20 respectively, and the fasteners 100 extending through the through holes 242 of the bracket 20 to screw into the mounting holes 123 of the first panel 12. The second panel 14 is mounted to the first panel 12. The through hole 142 of the second panel 14 aligns with the pivoting member 30 of the lighting apparatus.

Figure 5:
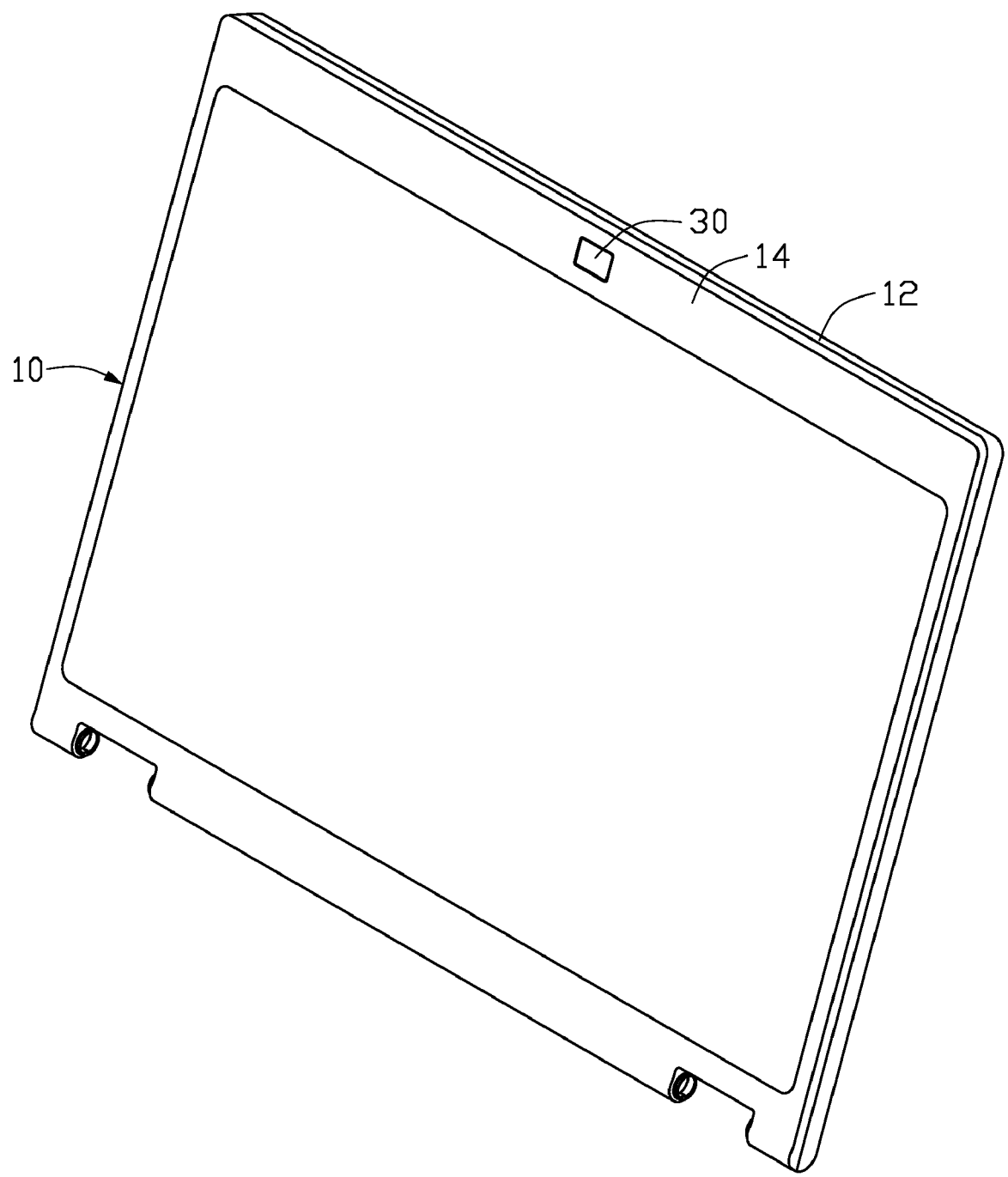
FIGS. 5 and 6 are assembled views of FIG. 1, showing the electronic device in two using states respectively.

Referring also to FIG. 5, when not using the lighting apparatus, the base board 31 of the pivoting member 30 is substantially coplanar with the second panel 14 against the resilient members 80.

Figure 6:
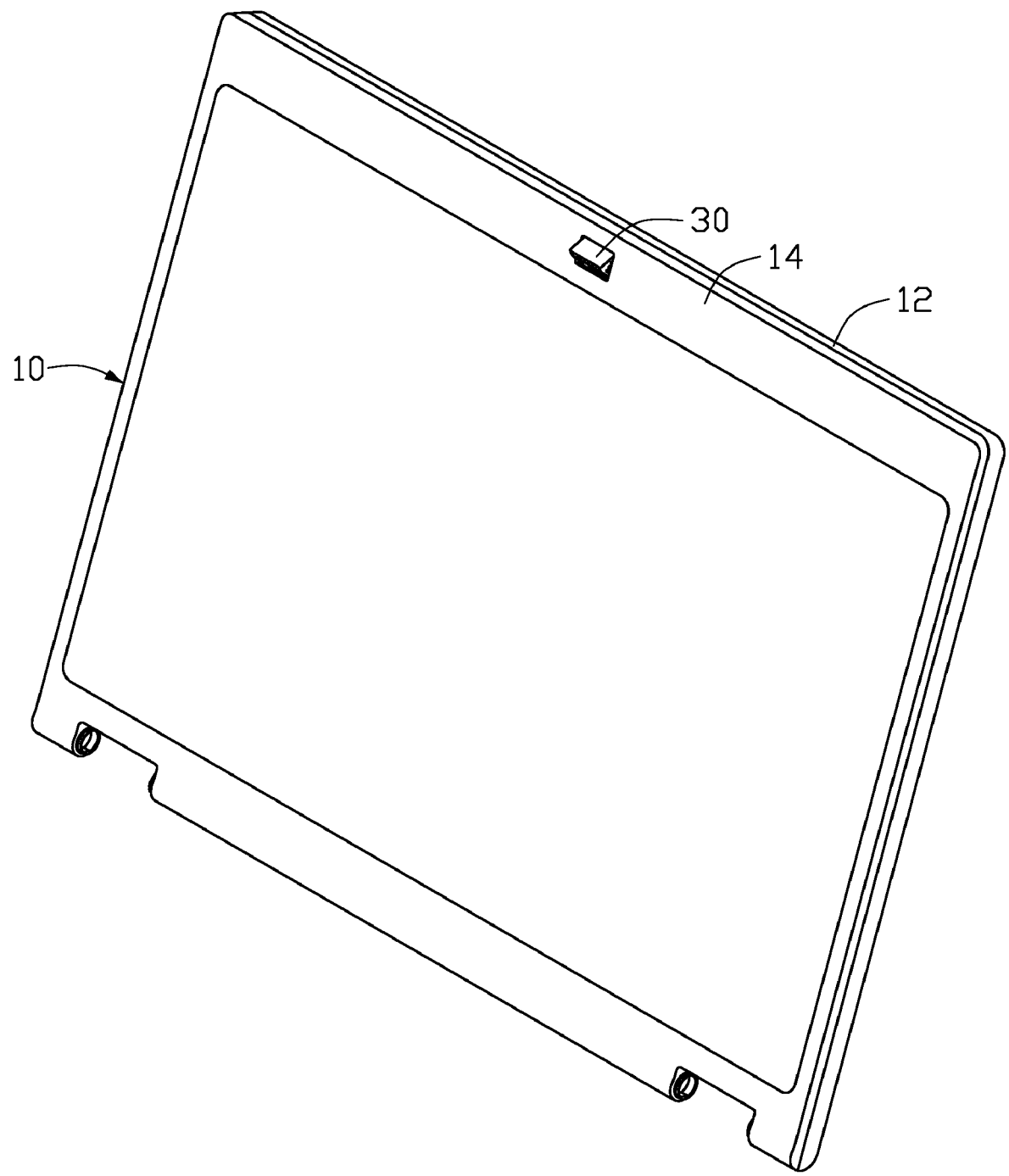

Referring also to FIG. 6, when using the electronic device in the dark, the base board 31 is pressed, the pivoting member 30 is pivoted out driven by the resilient members 80, therefore the light 79 shines through the through hole 142 of the second panel 14. The light 79 is capable of illuminating an operating area of the electronic device. When not using the lighting apparatus, the base board 31 of the pivoting member 30 is pressed again, the pivoting member 30 is pivoted to retract into the bracket 20 through the through hole 142 of the second panel 14.

The sliding member 50 slides in the latch slot of the pivoting member 30 to achieve the pivoting member 30 pivoting out and pivoting back. When using the lighting apparatus, the base board 31 of the pivoting member 30 is pressed, the small end of the sliding member 50 slides in the third sliding rail 339 toward the second sliding rail 338, and the resilient members 80 are distorted by the pivoting member 30. The resilient members 80 rebound to pivot the pivoting member 30 until the small end of the sliding member 50 is slid out of the third sliding rail 339. The small end of the sliding member 50 slides in the second slide rail 338, and then slides in the first sliding rail 337. Thus the pivoting member 30 is pivoted out of the through hole 142 of the second panel 14 to show up the light 79.

To retract the lighting apparatus, the base board 31 of the pivoting member 30 is pressed again, the small end of the sliding member 50 is slid in the first sliding rail 337 and then slid in the third rail 339. The pivoting member 30 drives the resilient members 80 to rebound, until the small end of the sliding member 50 slides to and engages in a bottom of the V-shaped third sliding rail 339. Then the pivoting member 30 is latched by the sliding member 50. Thereby the pivoting member 30 is received in the bracket 20.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic device comprising:
   a base with a through hole defined therein; and
   a lighting apparatus comprising a bracket mounted to the base, a pivoting member pivotably attached to the bracket, a light fixed to the pivoting member, at least a resilient member arranged between the bracket and the pivoting member to restore the pivoting member, and a sliding member mounted to the bracket with a first end;
   wherein a latch slot is defined in the pivoting member for receiving a second end of the sliding member, the pivoting member is driven by the at least a resilient member to pivot and the second end of the sliding member slide in the latch slot, for achieving the pivoting member pivoting out or pivoting back through the through hole of the base;
   wherein the latch slot comprises an unbent first sliding rail, an L-shaped second sliding rail, and a V-shaped third sliding rail, the first, second and third sliding rails are communicated end to end.

2. The electronic device as claimed in claim 1, wherein the bracket comprises a top wall, a first sidewall and a second sidewall extending from opposite ends of the top wall, two pivoting poles extend from inner surfaces of the first and second sidewalls in the vicinity of the top wall respectively, the pivoting member comprises a first board and a second board opposite to each other, the latch slot is defined in the second board, two arc-shaped sliding slots are defined in outer surfaces of the first and second boards of the pivoting member respectively, the pivoting member is pivotably mounted to the bracket via the pivoting poles of the bracket being engaged in the sliding slots of the pivoting member respectively.

3. The electronic device as claimed in claim 2, wherein at least a pole extends from the inner surfaces of the first and second sidewalls of the bracket in the vicinity of the corresponding pivoting poles, the at least a resilient member is fitted about the at least a pole with two ends of the at least a resilient member being propped on the top wall of the bracket and the corresponding first and second boards of the pivoting member respectively.

4. The electronic device as claimed in claim 2, wherein a block extends from a lower portion of an inner surface of the first sidewall of the bracket, a protrusion extends from the first board of the pivoting member, configured for engaging with the block of the bracket to avoid the pivoting member disengaging from the bracket against the at least a resilient member.

5. The electronic device as claimed in claim 2, wherein a resilient piece clamps a bottom of the second sidewall of the bracket, the resilient piece comprises a pressing portion adjacent to the inner surface of the second sidewall of the bracket, for being resiliently propped on the first end of the sliding member to make the second end of the sliding member be received in the latch slot of the pivoting member.

6. The electronic device as claimed in claim 5, wherein the resilient piece is made by bending a resilient metal piece, and further comprises a U-shaped main body, the main body comprises two sidewalls for clamping an outer surface and the inner surface at the bottom of the second sidewall of the bracket respectively, a depressed portion is defined in the outer surface of the second sidewall of the bracket, a blocking portion extends from a corresponding sidewall of the resilient piece for engaging in the depressed portion of the second sidewall of the bracket.

7. The electronic device as claimed in claim 2, further comprising a locking member, the locking member comprises a main body, and two hooks formed at opposite ends of the main body, two locking slots are defined in outer surfaces of the first and second sidewalls of the bracket, the hooks of the locking member are engaged in the locking slots of the first and second sidewalls respectively to cover an opening of the bracket between the first and second sidewalls.

8. The electronic device as claimed in claim 7, wherein two protrusions protrude from the main body of the locking member, configured for blocking the inner surfaces of the first and second sidewalls of the bracket respectively.

9. The electronic device as claimed in claim 2, wherein the bracket further comprises two ears extending from outer surfaces of the first and second sidewalls respectively, a through hole and a locating hole are defined in each of the ears, the base comprises a first panel, two mounting holes are defined in the first panel, two locating rods extend from the first panel in the vicinity of the mounting holes respectively for engaging in the locating holes of the bracket, two fasteners extend through the through holes of the bracket to screw into the mounting holes of the first panel respectively.

10. The electronic device as claimed in claim 9, wherein the base further comprises a second panel mounted to the first panel, the through hole of the base is defined in the second panel, the lighting apparatus is located between the first panel and the second panel.

11. The electronic device as claimed in claim 2, wherein the pivoting member further comprises a base board, the first and second boards extending from opposites ends of the base board, two opposite slots are defined in inner surfaces of the first and second boards respectively, the light is mounted to a mounting member whose opposite ends are engaged in the slots of the first and second boards, for mounting the light to the pivoting member.

12. The electronic device as claimed in claim 11, wherein the first and second panels are fan-shaped with a narrow top and a wide bottom.

13. The electronic device as claimed in claim 11, wherein two through holes are defined respectively in the first and second boards of the pivoting member in the vicinity of the base board communicating with the corresponding slots of the first and second boards of the pivoting member, two latch portions protrude from the ends of the mounting member for engaging in the through holes of the pivoting member.

14. The electronic device as claimed in claim 1, wherein the at least a resilient member is a torsion spring.

15. A lighting apparatus comprising:
a bracket comprising a top wall, a first sidewall and a second sidewall extending from opposite ends of the top wall, two pivoting poles extending from inner surfaces of the first and second sidewalls in the vicinity of the top wall respectively;
a pivoting member comprising a first board and a second board opposite to each other, two arc-shaped sliding slots defined in two first and second boards respectively;
a light fixed to the pivoting member;
a resilient member arranged between the bracket and the pivoting member to restore the pivoting member, and;
a sliding member comprising a first end attached to the bracket, and a second end;
wherein the pivoting member is pivotably mounted to the bracket via the pivoting poles of the bracket being engaged in the sliding slots of the pivoting member, a latch slot is defined in the second board of the pivoting member, the resilient member capable of restoring to make the pivoting member pivot with the second end of the sliding member sliding in the latch slot;
wherein the latch slot comprises an unbent first sliding rail, an L-shaped second sliding rail, and a V-shaped third sliding rail, the first, second and third sliding rails are communicated end to end.

16. The lighting apparatus as claimed in claim 15, further comprising a resilient piece mounted to the second sidewall of the bracket, configured for propping on the first end of the sliding member to make the second end of the sliding member be received in the latch slot of the pivoting member.

* * * * *